US010212882B2

(12) United States Patent
Mayerle

(10) Patent No.: US 10,212,882 B2
(45) Date of Patent: Feb. 26, 2019

(54) APPARATUS FOR CHOPPING AND DISCHARGING STRAW FROM A COMBINE HARVESTER

(71) Applicant: Dean Mayerle, Saskatoon (CA)

(72) Inventor: Dean Mayerle, Saskatoon (CA)

( * ) Notice: Subject to any disclaimer, the term of this patent is extended or adjusted under 35 U.S.C. 154(b) by 0 days.

(21) Appl. No.: 15/806,939

(22) Filed: Nov. 8, 2017

(65) Prior Publication Data
US 2018/0206403 A1    Jul. 26, 2018

Related U.S. Application Data

(63) Continuation of application No. 14/801,168, filed on Jul. 16, 2015.

(60) Provisional application No. 62/026,901, filed on Jul. 21, 2014.

(51) Int. Cl.
*A01F 12/40* (2006.01)
*A01D 41/12* (2006.01)
*A01F 12/10* (2006.01)

(52) U.S. Cl.
CPC .......... *A01D 41/1243* (2013.01); *A01F 12/10* (2013.01)

(58) Field of Classification Search
CPC .......................... A01D 41/1243; A01F 12/10
USPC .................................................. 460/111, 112
See application file for complete search history.

(56) References Cited

U.S. PATENT DOCUMENTS

| | | | |
|---|---|---|---|
| 6,238,286 B1 * | 5/2001 | Aubry | A01D 41/1243 460/111 |
| 6,343,986 B1 | 2/2002 | Hofer | |
| 6,547,169 B1 | 4/2003 | Matousek | |
| 6,656,038 B1 * | 12/2003 | Persson | A01D 41/1243 460/112 |
| 6,685,558 B2 * | 2/2004 | Niermann | A01D 41/1243 460/111 |
| 6,863,605 B2 * | 3/2005 | Gryspeerdt | A01F 12/40 460/111 |
| 6,881,145 B2 * | 4/2005 | Holmen | A01D 41/1243 460/112 |
| 7,220,179 B2 * | 5/2007 | Redekop | A01D 41/1243 460/112 |

(Continued)

FOREIGN PATENT DOCUMENTS

EP    2138024    12/2009

*Primary Examiner* — Thomas B Will
*Assistant Examiner* — Mai T Nguyen
(74) *Attorney, Agent, or Firm* — Adrian D. Battison; Ade & Company Inc.; Kyle R. Satterthwaiter

(57) ABSTRACT

A chopper for receiving the straw and/or chaff from a combine harvester includes a housing with a chopping rotor to transport the materials though a discharge opening onto a tailboard construction with downwardly facing guide surface and fins for spreading of the crop materials. A rotary spreader has a plurality of fan members with blades rotatable for discharge to a respective side of the rotary spreader. An arrangement is operable so that in a first mode the crop material is spread wholly by the tailboard and in a second mode the crop material is spread at least mainly by the rotary spreader. In the second mode the tailboard remains position above the rotary spreader which is therefore located underneath a guide surface with fins of the guide surface facing downwardly adjacent the blades. The movement to the second ode is provided by the rotary spreader being moved forwardly and downwardly.

33 Claims, 8 Drawing Sheets

(56) References Cited

U.S. PATENT DOCUMENTS

| | | | |
|---|---|---|---|
| 7,736,218 B2* | 6/2010 | Mayerle | A01D 41/1243 460/112 |
| 7,927,200 B2* | 4/2011 | Van Overschelde | A01F 12/40 460/112 |
| 8,210,915 B2* | 7/2012 | Holmen | A01D 41/1243 460/111 |
| 8,864,561 B2 | 10/2014 | Weichholdt | |
| 2004/0053652 A1* | 3/2004 | Duquesne | A01D 41/1243 460/112 |
| 2004/0176151 A1 | 9/2004 | Gryspeerdt | |
| 2005/0282602 A1* | 12/2005 | Redekop | A01D 41/1243 460/112 |
| 2009/0088231 A1* | 4/2009 | Murray | A01D 41/1243 460/111 |
| 2012/0270613 A1 | 10/2012 | Isaac | |
| 2013/0263565 A1* | 10/2013 | Yde | A01D 41/1243 56/122 |

* cited by examiner

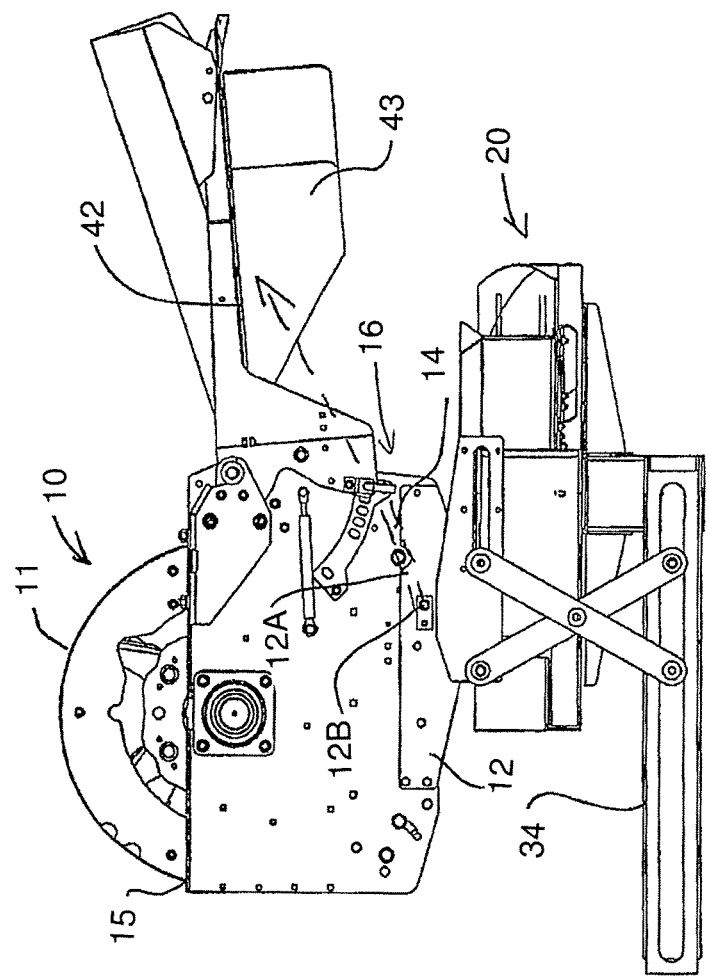

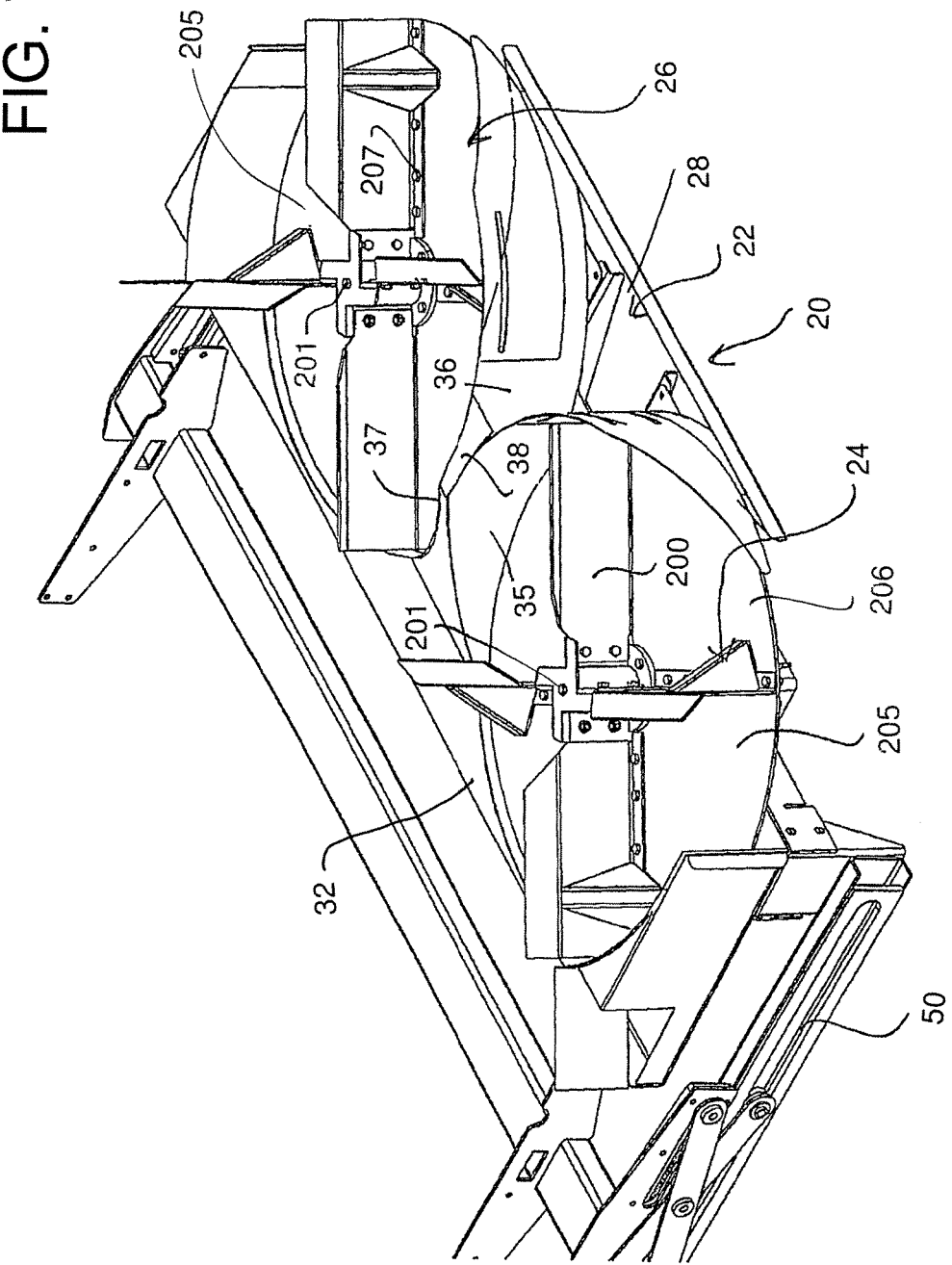

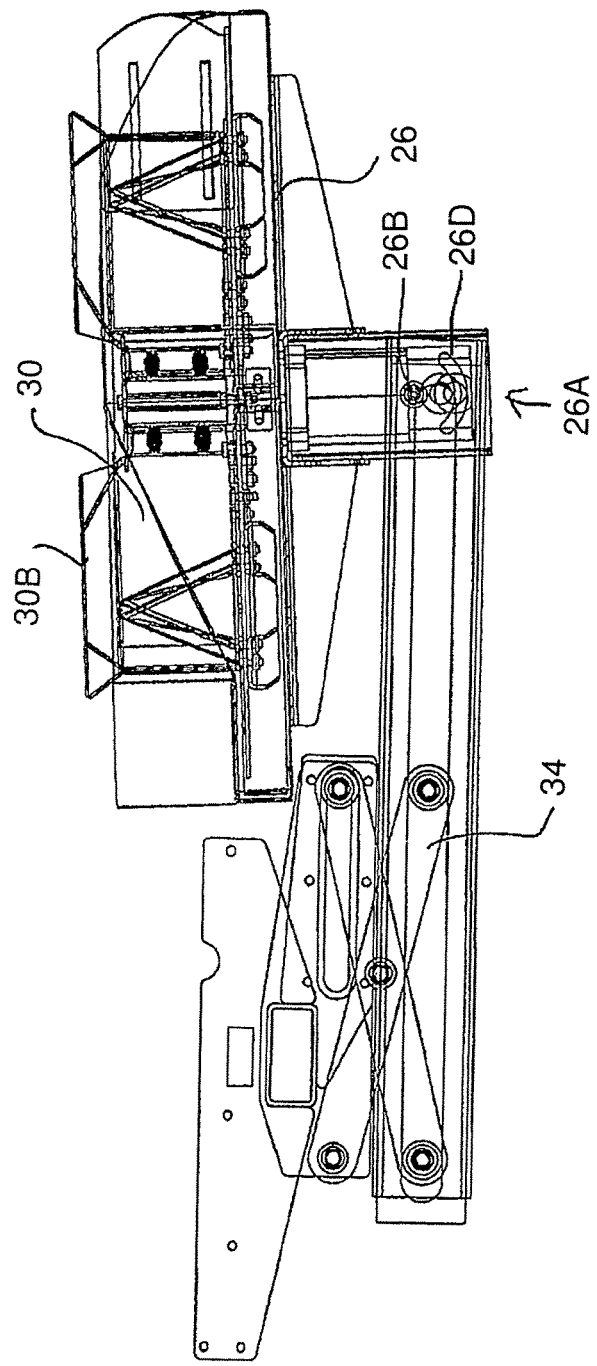

APPARATUS FOR CHOPPING AND DISCHARGING STRAW FROM A COMBINE HARVESTER

This application is a continuation of application Ser. No. 14/801,168 filed Jul. 16, 2015 which claims the benefit under 35 USC 119 (e) of Provisional Application 62/026,901 filed Jul. 21, 2014.

This invention relates to an apparatus for chopping and discharging straw from a combine harvester.

BACKGROUND OF THE INVENTION

In U.S. Pat. No. 6,840,854 issued Jan. 11, 2005 of Redekop is disclosed an apparatus for chopping and discharging straw from a combine harvester of the type which includes a plurality of blade members mounted on a hub for rotation about an axis of the hub with the blade members being arranged at spaced positions along the length of the hub substantially in radial planes of the hub so as to pass adjacent a plurality of axially spaced stationary blades again arranged in radial planes of the hub. The straw and other material discharged from the combine is fed into one side of the housing of the apparatus onto the hub and the material is carried around by the hub past the stationary blades in a chopping action. The material is then discharged from a discharge opening in the housing onto a tail board with spreading fins for spreading across the field.

Combine developments in recent years have put greater demands on the straw choppers and chaff spreaders. The main reasons are:

Larger combines and larger cutting widths are creating higher flows of straw and chaff;

Wider cutting widths create more demanding spreading widths;

Reduced tilling practices have put more demand on even spreading of both straw and chaff;

Plant breeding has resulted in tougher straw, higher yields and more residue;

Grain is often ready for harvest while the straw remains green;

The following problems can arise with existing technology:

When residue is not distributed evenly into a straw choppers by the threshing rotor(s) due to green, moist conditions it cannot be evenly distributed out of a chopper. Even with good distribution into a chopper, a traditional tailboard with fins does not do a good job distributing wet straw and chaff, often ending up with rows of undispersed green residue corresponding to each fin.

The best distribution performance in dry conditions is achieved with a tailboard since it is more power efficient, cost efficient and easier to set, dust is best controlled.

The best distribution in wet or green conditions is most often powered rotating discs.

Powered rotating discs do not work well in dry conditions in that they can provide uneven distribution in that long straw can be thrown farther, short straw and chaff when dry cannot be thrown far, leaving problems for spring seeding.

Currently a combine is purchased with either a powered rotating disc or a tailboard behind the straw chopper. The customer has to choose the option when he buys and, when harvest conditions change, they are stuck with the distribution method they chose.

In U.S. Pat. No. 6,663,485 assigned to Claas is disclosed the first power spreader brought to the market which has a discharge chute of chopper parallel with the spreader.

In U.S. Pat. No. 7,331,855 assigned to Deere is disclosed a powered Spreader at a 25 degree angle to residue flow. This is the first commercial successful power spreader which was developed for corn market to solve spreading of green stem soybeans where the plant remains green when grain is ripe.

The disclosures of all patents mentioned herein are incorporated herein by reference or may be referenced for further details not disclosed herein.

SUMMARY OF THE INVENTION

According to a first aspect of the invention there is provided a chopper and discharge apparatus arranged to be mounted at the rear discharge of a combine harvester for receiving the straw and/or chaff from the combine harvester and for discharging the materials from the combine harvester, the apparatus comprising:

a housing having a feed opening into which straw and/or chaff can be fed from the combine harvester;

a chopping assembly mounted in the housing;

the housing having a discharge opening through which the chopped materials are discharged;

a tailboard construction arranged relative to the housing so as to receive the stream of crop materials from the discharge opening to engage onto a downwardly facing guide surface of the tailboard construction for spreading of the crop materials;

a plurality of guide fins extending downwardly from the guide surface, the guide fins having a leading edge and fin surfaces extending from the leading edge rearwardly and outwardly from the leading edge to guide at least some of the chopped materials to sides of the tailboard in a spread pattern;

and a rotary spreader for spreading the crop material, the rotary spreader comprising rotating fan members each having a plurality of blades around an axis of the fan member so that the crop material enters the fan members and is carried around the axis by the fan members for discharge to a respective side of the rotary spreader;

and an arrangement operable so that in a first mode the crop material is spread wholly by the tailboard and in a second mode the crop material is spread at least mainly by the rotary spreader.

Typically, the chopping assembly mounted in the housing comprises a hub member mounted for rotation about a longitudinal axis of the hub member and a plurality of blade members mounted on the hub member for rotation therewith about the axis for chopping the fed materials and accelerating the chopped materials for discharge.

Typically the housing and the chopping assembly is arranged such that the straw and/or chaff enters into the feed opening and discharges as a stream of crop material extending across the width of the housing and chopping assembly.

Typically the tailboard construction has a plurality of fins thereon which have a leading edge adjacent the chopper discharge and extend rearwardly and outwardly from the leading edge to guide the crop material in the spread pattern as the material flows over the guide surface.

Typically the rotary spreader comprises a pair of side by side, counter-rotating fan members each having a plurality of blades rotatable around an axis of the fan member where the axes of the fan members are generally parallel and generally upstanding so that the crop material enters the fan members from a front edge of the rotary spreader and is carried rearwardly and outwardly around the axis by the fan members for discharge to a respective side of the rotary spreader;

Typically at least one of the tailboard and the rotary spreader and preferably the rotary spreader is movable relative to the housing from a first position in which the crop material is spread wholly by the tailboard to a second position in which the crop material is spread at least mainly by the rotary spreader.

Preferably the rotary spreader includes a base wall lying in a radial plane of the axes and two guide walls at right angles to the base wall and partly surrounding the respective axes so that the guide walls are closely adjacent at a center position between the fan members and diverge rearwardly and outwardly to a side discharge.

Typically the rotary spreader has the base wall at the bottom with the blades facing upwardly. However arrangements in accordance with this invention can be inverted so that the blades face downwardly.

Preferably the fan blades are open at edges thereof opposite the base wall, that is there is no confining or top cover wall.

Preferably in the second position the rotary spreader is located underneath the tailboard with the fins of the tailboard facing downwardly adjacent the blades. However the rotary spreader can be on the top.

Preferably the fan blades are open at edges thereof opposite the base wall so that crop material escaping out of the fan members encounters the guide fins of the tailboard.

Preferably the base wall and the guide surface are generally parallel in the second position so as to confine the blades of the rotary spreader and the guide fins of the tailboard therebetween. By generally parallel is intended to be included a relatively shallow angle therebetween where the tailboard diverges away from the base plate of the rotary cutter by the small angle. An angle of the order of 5 degrees can provide the best action. The angle can also be adjustable.

Preferably the guide fins have a bottom edge closely adjacent the open edge of the fan blades. That is the spacing is such that any material escaping cannot escape from the rear before it engages the fins to be spread by the action of the fins.

Preferably the fan blades have a canted top edge leaning forwardly in the direction of rotation.

Preferably the guide fins have a leading edge which is inclined downwardly and forwardly so as to tend to direct any lifted crop material back down onto the fan members.

Preferably the housing has a rearmost floor portion which is movable to direct flow into either the tailboard or into the rotary spreader when in the second position.

Preferably the floor portion is pivotal from a substantially horizontal position or downwardly inclined position for guiding the crop material rearwardly into the rotary spreader to an upwardly inclined position for guiding the crop material onto the guide surface of the tailboard.

Preferably the tailboard remains in position in the second position of the rotary spreader. However both components may be moved in the second position.

Preferably the rotary spreader is movable in the first position downwardly and forwardly to a position underneath the housing.

Preferably the rotary spreader is mounted for adjustment pivotal movement about an axis transverse to the housing so as to change the angle of the base wall.

Preferably the rotary spreader engagement angle is adjustable between 2 and 24 degrees Preferably the tailboard is also mounted for adjustment pivotal movement about an axis transverse to the housing so as to change the angle of the guide surface.

Preferably in the second position of the rotary spreader the crop material is directed into the rear of the fan members rather than onto the guide surface of the tailboard.

Preferably the chopping assembly comprises a center chopping section and two end fan sections where the blade members in the center chopping section and the two end fan sections are arranged such that an air flow generated thereby is driven radially outwardly by the blade members so as to exit from the housing radially outwardly from the blade members through the discharge opening and where the blade members in the center chopping section are substantially all cutting blade members each of which is defined substantially by a planar cutting portion lying in a radial plane of the hub axis and the blade members in each of the fan sections are substantially all fan blade members each of which includes a fan blade portion arranged to extend outwardly to at least one axial side of the radial plane so as to generate an increased air flow relative to said flat blade members. This arrangement is typically known as a "fan end" rotor.

Typically the chopping assembly mounted in the housing and comprises a hub member mounted for rotation about a longitudinal axis of the hub member and a plurality of blade members mounted on the hub member for rotation therewith about said axis for chopping the fed materials and accelerating the chopped materials for discharge.

Typically the housing and the chopping assembly are arranged such that the straw and/or chaff enters into the feed opening and discharges as a stream of crop material extending across the width of the housing and chopping assembly.

Typically the rotary spreader comprises a pair of side by side, counter-rotating fan members each having a plurality of blades rotatable around an axis of the fan member where the axes of the fan members are generally parallel and generally upstanding so that the crop material enters the fan members from a front edge of the rotary spreader and is carried rearwardly and outwardly around the axis by the fan members for discharge to a respective side of the rotary spreader.

Typically the rotary spreader includes a base wall lying in a radial plane of the axes and two guide walls at right angles to the base wall and partly surrounding the respective axes so that the guide walls are closely adjacent at a center position between the fan members and diverge rearwardly and outwardly to a side discharge.

Typically the fan blades are open at edges thereof opposite the base wall.

Preferably the fins have a leading edge adjacent the chopper discharge and extend rearwardly and outwardly from the leading edge to guide the crop material in the spread pattern as the escaping crop material flows over the guide surface.

Preferably the rotary spreader is located underneath the guide surface with the fins of the guide surface facing downwardly adjacent the blades. However this can be inverted in some embodiments.

The arrangements particularly described herein may provide one or more of the following features:

the distribution from the chopper can be changed based on conditions with both distribution systems are available on the combine so that the operator can select the best to suit the prevailing conditions.

the system provides an enhanced method to distribute the residue out of the chopper and therefore the distance and evenness of the straw spread.

the system provides a powered rotating spreader that is housed under the tailboard and fins of a combines straw chopper does not provide restriction to the straw chopper. Other known arrangements can be restrictive and can plug up the chopper/combine.

the system solves a big problem for powered rotating spreaders which is how to split the straw between the two discs.

the tailboard fins which used with the rotary spreader also do the job of spreading any material not engaged in the rotating discs.

In general, the arrangement herein provides a traditional residue management system on a harvesting combine which consists of a drive system, chopper housing for cutting the residue, and a tailboard for distributing the residue in an even spread pattern back over the field.

The chopper housing typically consists of a chopping rotor, a stationary knife bank to cut and size the residue. In dry conditions a tailboard typically does the best job at spreading the residue in an even distribution back across the harvested width of the combine.

In wet or tough straw conditions the powered spreader typically provides the best distribution. The powered spreader consists of the two hydraulically powered discs that rotate opposite of each other. Standing from the rear, the left disc rotates clockwise, the right disc rotates counter clockwise. The cut straw is thrown into the spreader and the spreader changes the direction of the straw. Adjustments for modifying distribution consist of a sliding rear deflector, rotation of the spreader angle or change of speed of the spreader discs, either together or independently left and right. All changes although not shown can easily be modified to be actuated by the operator from the cab of the combine.

The rear portion of the floor is rotated from the tailboard distribution position. This enables the cut straw to flow directly into the open front of the spreader for easy engagement by the paddles on the discs of the spreader. The inlet is not restricted as in some prior art designs, allowing for a wider range of operating conditions.

The spreader angle relative to the chopper discharge is adjustable from 2-24 degrees. This engagement angle allows the paddles on the spreader to better entrap the material in its paddles. Any material that in not engaged by the paddles is thrown up into the tailboards fins solving a problem inherent to a rotating spreader disc designs. In prior art designs when the counter rotating discs come together at the center of the power spreader often a stream of material is not retained by the paddles and escapes leaving a strip in the field. The simplicity of an upper cover with fins spreading this stream is novel and provides a simple solution to the biggest problem with power spreaders.

The leading edge of the tailboard fins also naturally deflect material down into the spreader to provide more material with a positive engagement with the spreaders paddles.

BRIEF DESCRIPTION OF THE DRAWINGS

One embodiment of the invention will now be described in conjunction with the accompanying drawings in which:

FIG. 6 is cross-sectional view of the components of FIG. 1 in the first stored position and showing the floor portion of the housing moved to the second position to cooperate with the tailboard.

FIG. 7 is an isometric view of the rotary spreader only.

FIG. 8 is a cross-sectional view of FIG. 7.

In the drawings like characters of reference indicate corresponding parts in the different figures.

DETAILED DESCRIPTION

Figure 1:
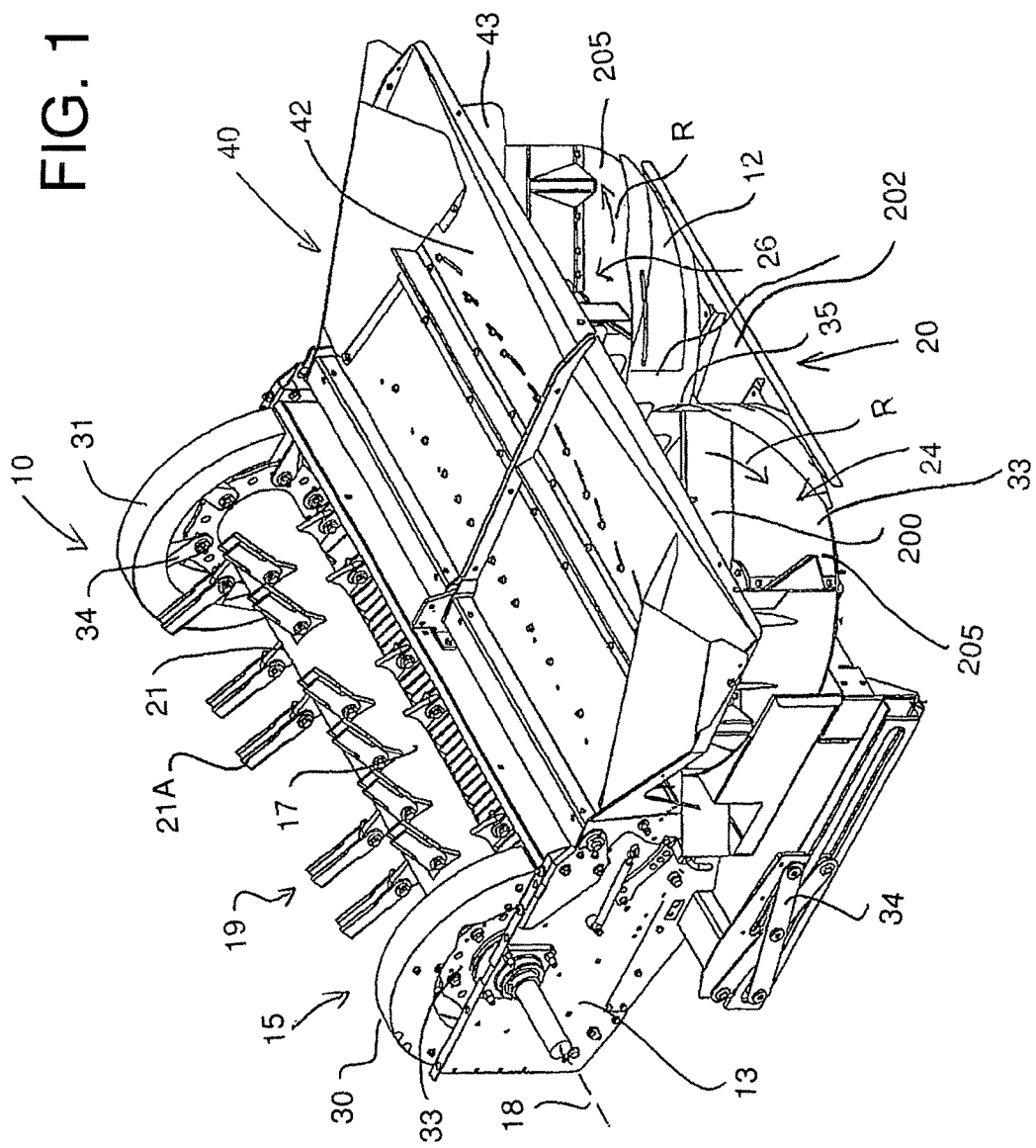
FIG. 1 is an isometric view of straw chopper according to the present invention with the top cover removed and with the rotary spreader shown in the second operating position.
Figure 2:
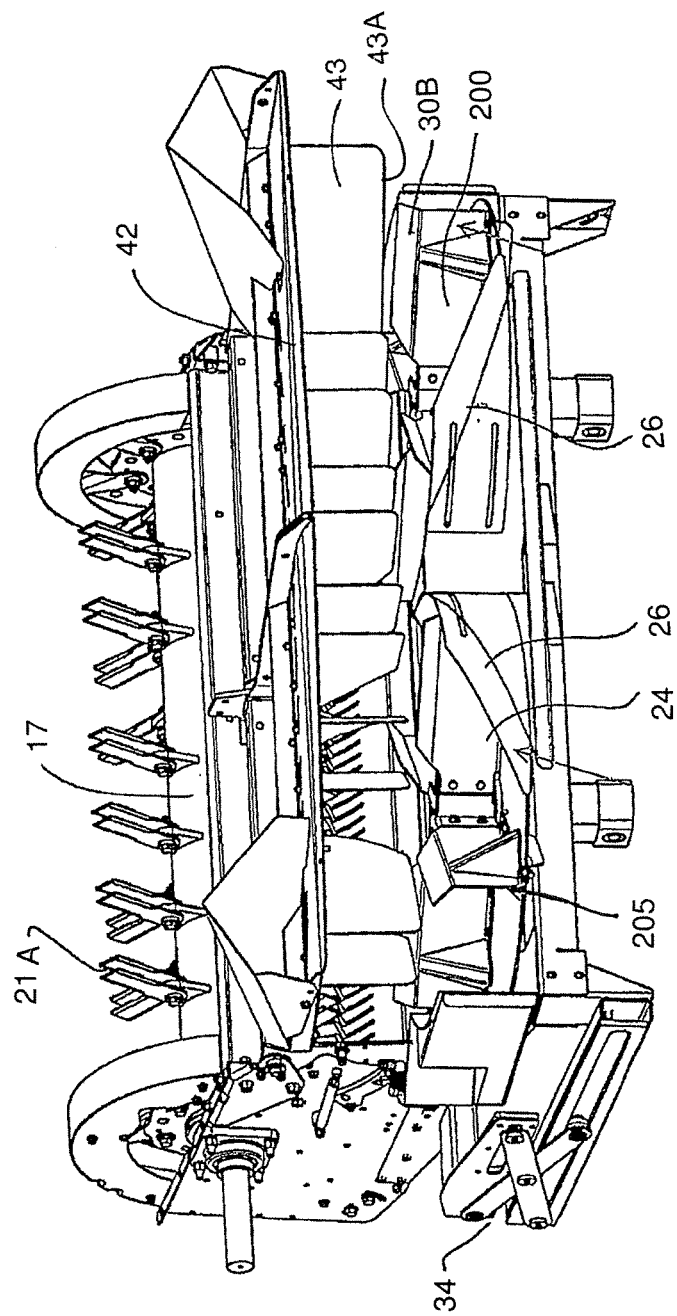
FIG. 2 is an isometric view of the components of FIG. 1 but from a different angle.

The chopper and discharge arrangement shown in FIGS. 1 to 4 is very similar to that from the prior patents of Redekop which are U.S. Pat. Nos. 5,232,405 and 5,482,508.

The apparatus which is basically as shown in U.S. Pat. No. 6,840,854 issued Jan. 11, 2005 of Redekop therefore comprises a housing 10 defined by a top wall 11, a bottom wall 12 and two end walls 13. The end walls 13 include attachment means for attachment of the housing to the outlet of a combine harvester for discharge of straw and possibly chaff from the combine harvester into an inlet opening 15 of the housing 10. The bottom wall 12 defines a semi-cylindrical portion extending from the inlet 15 to a discharge opening 16 through which chopped straw and air is discharged at relatively high velocity for spreading across the field or for transportation into a container.

Within the housing is mounted a hub 17 which is carried on suitable bearings for rotation about a hub axis 18 at a center of the housing so that blade members 19 carried by the hub sweep around within the housing to entrap straw fed through the inlet 15 and to carry the straw and air past stationary blades 20 for chopping and for discharge through the outlet 16. The stationary blades 20 are mounted on the housing at a position approximately midway between the inlet 15 and the outlet 16 so that the blade members 19 sweep between the stationary blades in a cutting action.

The hub 17 carries a plurality of lugs 21 at angularly and axially spaced positions therealong with each lug mounting a pair of blade members as described in more detail hereinafter for pivotal movement of the blade members about a pin 22 parallel to the axis 18.

Figure 3:
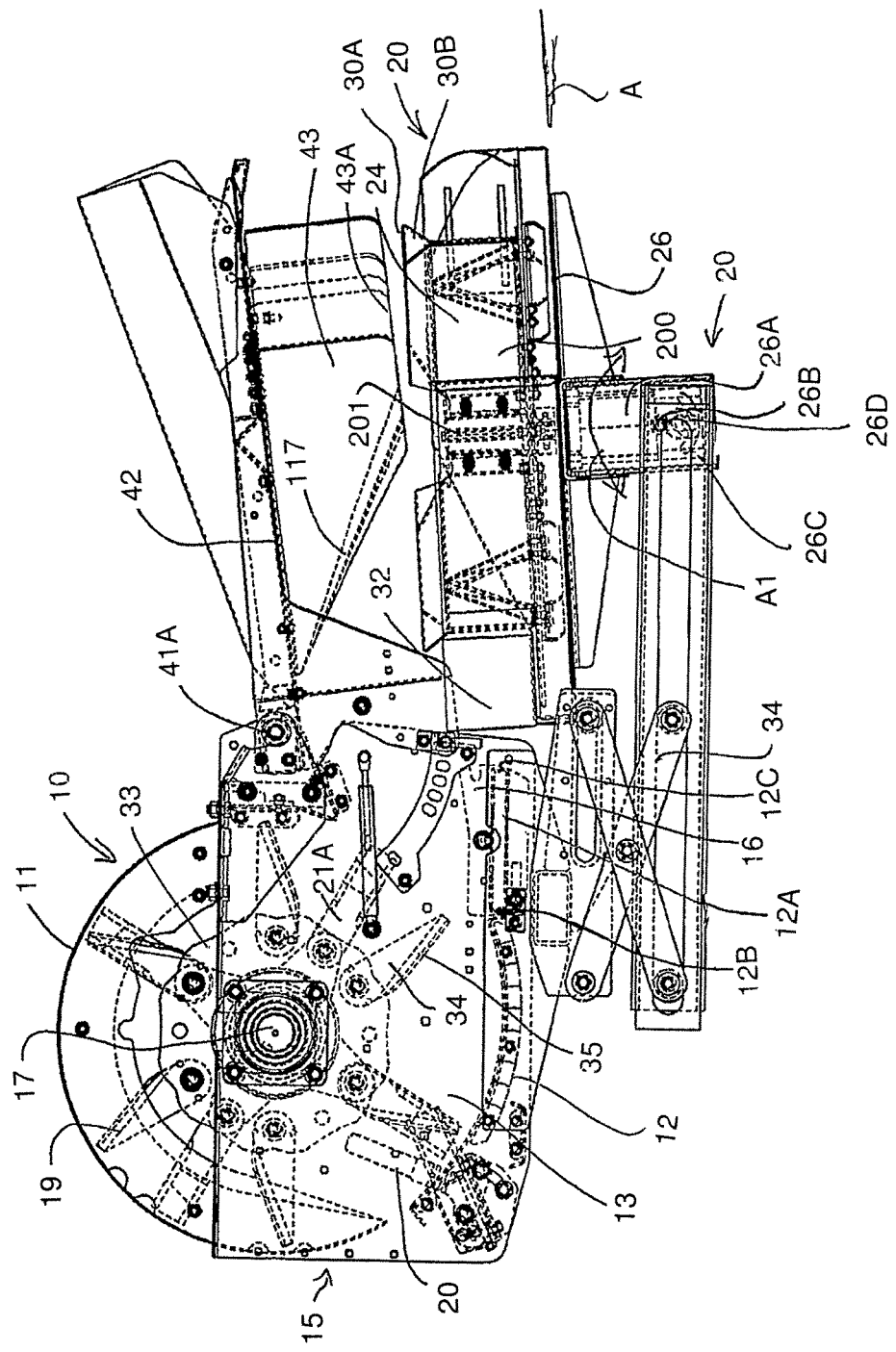
FIG. 3 is a cross-sectional view of the components of FIG. 2.
Figure 4:
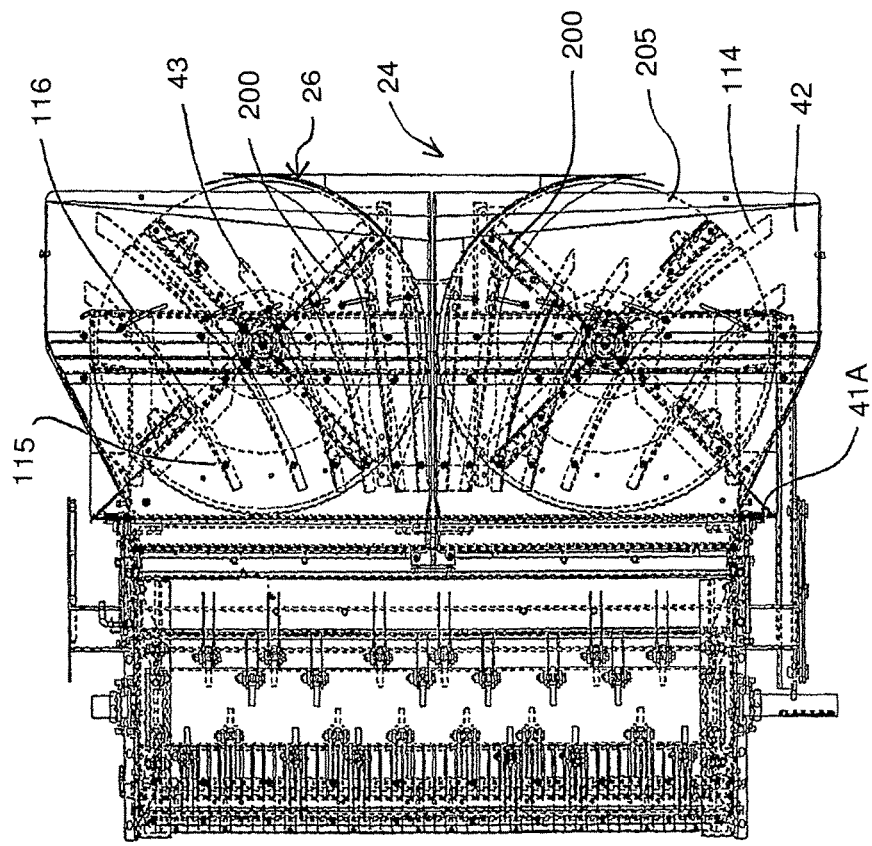
FIG. 4 is a top plan view of the components of FIG. 1.
Figure 5:
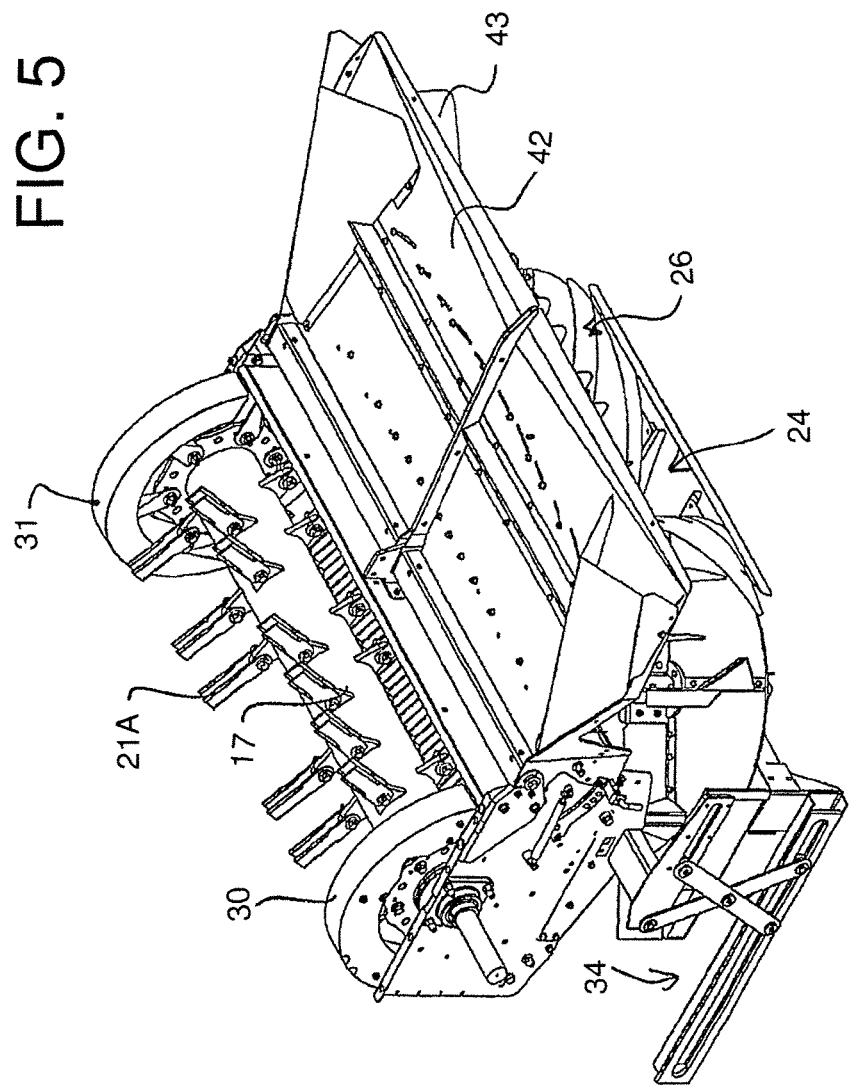
FIG. 5 is an isometric view of the components of FIG. 1 with the rotary spreader partly moved to the first stored position.

From FIG. 3 it will be noted that the lugs 21 are arranged in a spiral pattern around the hub 17. Each of the lugs carries a pair of blade members. Each lug is aligned with a respective one of the stationary blades 20 so that each stationary blade has associated with it a respective one of the lugs and thus has associated with it the pair of blades carried by that lug. Each stationary blade is thus swept by the blade members once for each rotation of the hub with some of the stationary blades being swept at each of the four 90° positions of rotation of the hub.

In this arrangement of the chopper, there is provided three sections of the chopper assembly including a first fan section 30 at one end of the hub 17 and the second fan section 31 at the other end of the hub 17. In-between the two narrow fan sections is defined a center section which provides the whole of the cutting action.

Within the center section all or substantially all of the blades are cutting blades formed with a cutting edge lying in a radial plane of the axis 18. The blades may be of the conventional flat blade type with a leading a trailing chamfered edge as best shown in FIG. 3, but can include components out of the plane if they do not interfere with the cutting action. Thus each of the two flail blades 21A in the center section can pass closely on either side of a respective one of the stationary blades. Thus the stationary blades can be spaced by a distance which is just sufficient to allow the passage there between of the cutting blade 21A.

In the fan sections 30 and 31, there is provided a ring 33 which is mounted on the hub 17 at a respective end of the hub. The ring thus surrounds the cylindrical wall of the hub and stands outwardly therefrom just beyond the end of the center section defined by the stationary blades and the blades 21 carried on the hub.

The rings 33 each carry a plurality of fan blades 34 at spaced positions around the ring. The fan blades 34 are arranged thus so that each follow directly behind the next at the same axial location and there is no staggering of the fan blades 34.

Each of the fan blades 34 is bent with a fan blade portion 35 so that each of the fan blades is of the shape shown in FIG. 3 of the U.S. Pat. No. 5,482,508 of Redekop. However the fan blades 34 do not necessarily have a sharp and leading edge since there is intended to be no cutting action in the fan section. Thus the fan blades are spaced from the end most stationary blade so that in effect no cutting action occurs in this section.

The bent fan blade portion stands outwardly to one side of the flat plate portion of the fan blade. The fan blade portion which is bent at right angles to the main body of the fan blade is maximised in dimension so that it may be rectangular.

There is no baffle or other elements within the housing or on the chopper assembly to prevent air flow or material flow axially between the center section and the fan sections. The mounting ring 33 is only slightly greater in dimension than the hub so that it does not significantly interfere with the air flow between the hub and the housing since the majority of the air flow is around the outside of the housing where the fan blades are at their most effective.

The fan blade portion 35 is inclined forwardly and outwardly so that at a regularly outer position toward the outer end of each fan blade the fan blade portion is angularly advanced relative to its position closer to the axis of the hub. This incline outwardly and forwardly significantly increases the air flow effect driving the air in the greater volume and at higher speed radially from the fan section and outwardly of the exit 16.

Preferably the fan section comprises only a single row of the fan blades but in some cases an additional row or rows may be provided although this is not preferred. The fan blades are arranged immediately adjacent the end walls 13 so that they take up minimum space at the end of the chopper assembly. It will be appreciated that the intention is to provide maximum air flow in the fan sections while taking up minimum dimensions so that the maximised chopping effect to provide shortest material is achieved within the center section using the flat blades.

Just at the fan section, the housing provides a cover wall which reduces the amount of feed material which enters the fan section although of course this is not precluded in view of the fact that the material can flow axially from a position at the flat blades into the fan section due to the tendency for the fan section to draw air axially outwardly at the inlet and to drive air axially inwardly at the outlet.

In operation a very high velocity of air from the fan section exiting radially outwardly from the exit discharge 16 occurs not only at the fan section but also extends partly into the width of the center section so that approximately 12 to 15 inches of the center section has a velocity at the exit which can be greater than 75 Ws.

The above arrangement of chopper is one example only of arrangements which can be used herein.

The spreaders disclosed herein are used with a combine commonly used in grain farming to harvest a variety of crops. As a combine moves through a field during a harvesting operation, the ripened crop is cut from the field by a header at the front of the combine. The crop is then transferred into threshing and separating assemblies (not shown) within the combine, where grain is removed from the crop material. The grain is transferred and stored in a hopper (not shown) onboard the combine until it can be off-loaded for transport. The crop material other than grain, which is referred to herein as crop residue, is further processed or chopped, and then broadcast over a wide area behind the combine by the spreader attached to the rear of the combine. For greater broadcast widths, the spreader comprised of counter-rotating impellers 24 and 26 can be employed for this task and can be moved out of operating position to allow use only of the conventional tail board 40 or into operating position to cooperate with the conventional tail board 4.

The power spreader 20 comprises a right-side impeller 26, and a left-side impeller 24, that counter-rotate on parallel axes, as indicated by the direction of the arrows R in FIG. 1. Generally, the axes of rotation are oriented substantially vertically, but may also be inclined either forward or rearward to optimize spreader performance. Typically, these impellers 24 and 26 are driven by hydraulic motors, but can also be powered by electric motors or other mechanical transmission means. The spreader 20 is adapted to receive crop residue from the chopper 10 and evenly broadcast it over the entire combine harvesting pass. In operation, crop residue is expelled from the outlet of the chopper 10. In operation as shown in FIG. 3, the floor panel 14 of the chopper carries the crop residue generally horizontally rearwardly into the rear of the power spreader 20 including the counter-rotating impellers 24 and 26 of the spreader mechanism. The impellers 24 and 26 receive the crop residue from the chopper and broadcast it rearwardly and outwardly away from the combine to achieve an even distribution of crop residue over the width of the combine or harvester. The total width and location of crop residue distribution by the spreader 20 is dependent, at least in part, on the rotational speed of the impellers 24 and 26. The higher the rotational speed of the impellers 24 and 26, the wider the resulting broadcast width.

FIG. 7 shows a view of the impeller-type spreader 20 of the present invention. The spreader 20 is enclosed in a frame 22 with the tops of the impellers 24 and 26 being exposed upwardly and free from a cover carried by the housing. The impellers 24 and 26 sit on a stationary bottom panel 28, and have upwardly extending impeller blades 200 that engage the crop residue. The spreader 20 is affixed to the rear of the combine 10 by means of securing struts 50 that secure the spreader 20 when in operating position at an operating distance behind the combine to receive the crop residue from the chopper 10 via the floor panel 14. The spreader 20 can be pivoted down and forward to a position underneath the chopper when not required so as to be positioned out of the way for use of the conventional tail board and for transport purposes, but the position of the spreader 20 for operational purposes is not intended to be varied.

In dry conditions the tailboard 4 typically does the best job at spreading the residue in an even distribution back across the harvested width of the combine.

The tailboard 40 comprises a base plate 42 with a series of fins 43 on the underside shaped and arranged so that material exiting from the discharge opening 16 is thrown up against the underside of the tailboard and impacts the fins causing a change in direction of the material on the tailboard so as to spread the material using the momentum generated in the stream from the rotor. The angle of the tailboard can be adjusted around the pivot 41A by positioning a spring loaded pin 44.

In the arrangement particularly described herein, the chopper 15 has two symmetrical sides each of which incorporates six fins 114 that pivot about front holes 115 and are fixed along a back slot 116. This tailboard incorporates a first leading edge 117.

In wet or tough straw conditions a powered spreader typically provides the best distribution. Shown in FIGS. 1 to 5 in the operating position, the powered spreader 20 consists of two hydraulically powered discs 11 that rotate opposite of each other. Standing from the rear, the left disc rotates clockwise, the right disc rotates counter clockwise. The cut straw is thrown into the spreader and the spreader changes the direction of the straw. Adjustments for modifying distribution include a sliding rear deflector 12, rotation of the spreader angle or change of speed of the spreader discs, either together or independently left and right. All changes although not shown can easily be modified to be actuated by the operator from the cab of the combine.

A rear portion 12A of the floor or bottom wall 12 is rotatable about a pivot 12B from the tailboard distribution position which is shown in FIG. 6 to a direct entry into the spreader as shown in FIG. 3. This position in FIG. 3 where a rear edge 12C of the portion 12A is lowered enables the cut straw to flow directly into the open front of the spreader 20 for easy engagement by the paddles on the discs of the spreader. The inlet is not restricted as in some prior art designs, allowing for a wider range of operating conditions.

As shown in FIG. 3 an adjustment device 26B allows the spreader angle A relative to the chopper discharge to be adjustable from 2-24 degrees. This engagement angle allows the paddles on the spreader to better entrap the material in its paddles. Any material that in not engaged by the paddles is thrown up into the tailboards fins solving a problem inherent to a rotating spreader disc designs. In prior art designs, when the counter rotating discs come together at the center of the power spreader often a stream of material is not retained by the paddles and escapes leaving a strip in the field. The simplicity of an upper cover with fins provided by the tail board spreading this stream is novel and provides a simple solution to the biggest problem with power spreaders.

The leading edge of the tailboard fins 117 also naturally deflect material down into the spreader to provide more material with a positive engagement with the spreaders paddles.

FIG. 6 shows the spreader in the non-operating position, storage for when the rear floor 12A of the chopper floor 12 has been flipped back to its conventional upwardly inclined position to direct the material upwardly and rearwardly and the tailboard is used to distribute residue in conventional manner.

The apparatus thus is arranged to be mounted at the rear discharge of a combine harvester (not shown) for receiving the straw and/or chaff from the combine harvester and for discharging the materials from the combine harvester. This includes the housing 11 having a feed opening 15 into which straw and/or chaff can be fed from the combine harvester.

The chopping assembly is mounted in the housing and comprising a hub member 17 mounted for rotation about a longitudinal axis of the hub member and a plurality of blade members 21A and 34 mounted on the hub member 17 for rotation therewith about said axis for chopping the fed materials and accelerating the chopped materials for discharge. The housing 11 has a discharge opening 16 through which the chopped materials are discharged arranged such that the straw and/or chaff enters into the feed opening 15 and discharges as a stream of crop material extending across the width of the housing and chopping assembly.

The tailboard construction 40 is arranged relative to the housing so as to receive the stream of crop materials from the discharge opening 16 to engage onto a downwardly facing guide surface 42 of the tailboard construction for spreading of the crop materials with a plurality of fins 43 thereon which have a leading edge 117 adjacent the chopper discharge and extend rearwardly and outwardly from the leading edge to guide the crop material in the spread pattern as the material flows over the guide surface.

The rotary spreader 20 is arranged for spreading the crop material includes the side by side, counter-rotating fan members 24, 26 rotatable around an axis 201 of the fan member where the axes 201 of the fan members are generally parallel and generally upstanding. Each of the fan members has a plurality of blades 200 fastened by fasteners 207 to a bottom plate 205 of the fan member which is in a radial plane of the axis 201 and on top of a base wall 202 of the rotary spreader. The fan members 24 and 26 are arranged so that the crop material enters the fan members from a front edge 32 of the rotary spreader and is carried rearwardly and outwardly around the axes 201 by the fan members for discharge to a respective side of the rotary spreader at a discharge opening 206 at the rear and side controllable by a rotatable flap to vary the spreading effect as required.

The rotary spreader 20 is movable relative to the housing 11 from a first position stored underneath the housing 11 on a mechanism 204 which can have many different forms of linkage to obtain the required movement. In the first position in which the rotary spreader is stored, the crop material is spread wholly by the tailboard. In the second position the crop material is spread mainly by the rotary spreader but with assistance from the tailboard which provides the fins to help guide any lifting material in the spreading action.

The rotary spreader includes a base wall 202 lying in a radial plane of the axes and two guide walls 35, 36 at right angles to the base wall and partly surrounding the respective axes so that the guide walls are closely adjacent at a center position 37 between the fan members at which is provided a cover wall 38. The walls 35, 36 diverge rearwardly and outwardly to the side discharge.

The fan blades are open at top edges thereof opposite the bottom plate 205 of the fan members so that material can enter from above and can unintentionally lift out of the fan members particularly at the center where rapid acceleration is occurring.

In the second position shown in FIGS. 1 to 5 the rotary spreader is located directly underneath the tailboard with the fins 43 of the tailboard facing downwardly and immediately adjacent the top edge of the blades 30 with only a small clearance therebetween to prevent engagement.

As the fan blades are open at edges thereof opposite the base wall crop material lifting upwardly out of the fan members immediately encounters the guide fins of the tailboard and is thus guided thereby outwardly in the spreading action due to the rearward movement of the material from the ejection from the chopper. The guide fins 43 have a bottom edge 43A closely adjacent the open edge 30A of the fan blades where the fan blades have a canted top edge 30B leaning forwardly in the direction of rotation.

The base wall 202 and the guide surface 42 are generally parallel in the second position so as to confine the blades of the rotary spreader and the guide fins of the tailboard therebetween.

The leading edge 117 is inclined downwardly and rearwardly so as to tend to direct any lifted crop material back down onto the fan members.

The housing 11 has the floor portion 12A which is movable to direct flow into either the tailboard or into the rotary spreader when in the second position so that it is pivotal from a substantially horizontal position in FIG. 3 for guiding the crop material rearwardly into the rotary spreader to an upwardly inclined position in FIG. 6 for guiding the crop material onto the guide surface 42 of the tailboard.

The tailboard remains in position in the second position of the rotary spreader so that it cooperates with the rotary spreader to reduce the problem of the material which discharges upwardly from the rotary blades adjacent the center of the fan members as described above.

The rotary spreader 20 has the base plate 202 and drive motor 26A mounted for adjustment pivotal movement on a bracket 26B with an adjustment slot 26C about an axis 26D transverse to the housing so as to change the angle of the base wall as indicated at angle A1 between 2 and 24 degrees.

The tailboard is mounted for adjustment pivotal movement about the axis 41A transverse to the housing so as to change the angle of the guide surface so that these can be kept generally parallel to maintain the cooperation between the blades 30 and the fins 43.

The floor portion 12A is arranged so that in the second position of the rotary spreader the crop material is directed into the rear of the fan members at the entrance 32 rather than onto the guide surface 42 of the tailboard.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A chopper and discharge apparatus arranged to be mounted at the rear discharge of a combine harvester for receiving and discharging materials from the combine harvester comprising straw and/or chaff, the apparatus comprising:
   a housing having a feed opening into which a stream of said materials comprising straw and/or chaff is fed from the combine harvester;
   a chopping assembly mounted in the housing for chopping said stream to form chopped materials;
   the housing having a discharge opening through which the chopped materials are discharged;
   a tailboard construction arranged relative to the housing so as to receive the stream of crop materials from the discharge opening to engage onto a downwardly facing guide surface of the tailboard construction for spreading of the crop materials;
   a plurality of guide fins extending downwardly from the guide surface, the guide fins having a leading edge and fin surfaces extending from the leading edge rearwardly and outwardly from the leading edge to guide at least some of the chopped materials to sides of the tailboard construction in a spread pattern;
   and a rotary spreader for spreading the crop material, the rotary spreader comprising rotating fan members each having a plurality of fan blades around an axis of the fan member so that the crop material enters the fan members and is carried around the axis by the fan members for discharge;
   the rotary spreader being mounted for movement thereof relative to the housing to a first position in which the rotary spreader is spaced from the discharge opening of the housing so that in a first mode the crop material is spread wholly by the tailboard construction;
   and the rotary spreader being mounted for movement thereof relative to the housing to a second position in which the rotary spreader is located with the fan blades adjacent the guide fins for cooperation therewith so that in a second mode the crop material is spread mainly by the rotary spreader.

2. The apparatus according to claim 1 wherein in the second position the rotary spreader is arranged such that crop material from the rotary spreader engages the guide fins on the tailboard construction.

3. The apparatus according to claim 1 wherein in the second position the rotary spreader is located underneath the tailboard construction with the downwardly facing guide fins adjacent the blades.

4. The apparatus according to claim 3 wherein the fan members each comprise a bottom wall with the fan blades extending generally at right angles thereto so that the fan blades are open at edges thereof opposite the bottom wall so that crop material lifting upwardly out of the fan members encounters the guide fins.

5. The apparatus according to claim 4 wherein the bottom wall and the guide surface are generally parallel in the second position.

6. The apparatus according to claim 4 wherein the guide fins have a bottom edge closely adjacent the open edge of the fan blades.

7. The apparatus according to claim 6 wherein the guide fins have a leading edge which is inclined downwardly and forwardly so as to tend to direct any lifted crop material back down onto the fan members.

8. The apparatus according to claim 1 wherein said housing comprises a floor portion of the housing which is movable to direct flow into either the tailboard construction in the first mode or into the rotary spreader in the second mode.

9. The apparatus according to claim 8 wherein the floor portion is pivotal from a substantially horizontal position for guiding the crop material rearwardly into the rotary spreader to an upwardly inclined position for guiding the crop material onto the guide surface of the tailboard construction.

10. The apparatus according to claim 1 wherein the rotary spreader is movable in the first position downwardly and forwardly to a position underneath the housing.

11. A chopper and discharge apparatus arranged to be mounted at the rear discharge of a combine harvester for receiving and discharging materials from the combine harvester comprising straw and/or chaff, the apparatus comprising:
   a housing having a feed opening into which a stream of said materials comprising straw and/or chaff is fed from the combine harvester;
   a chopping assembly mounted in the housing for chopping said stream to form chopped materials;
   the housing having a discharge opening through which the chopped materials are discharged;

a rotary spreader for spreading the crop material, the rotary spreader comprising rotating fan members each having a plurality of fan blades around an axis of the fan member so that the crop material enters the fan members and is carried around the axis by the fan blades for discharge;

a tailboard construction for spreading of the crop materials;

the tailboard construction having a downwardly facing guide surface of the tailboard construction and a plurality of guide fins extending downwardly from the guide surface, the guide fins having a leading edge and fin surfaces at least some of which extend from the leading edge rearwardly and outwardly from the leading edge to guide at least some of the chopped materials to sides of the tailboard in a spread pattern;

wherein the rotary spreader is located underneath the tailboard with the downwardly extending guide fins of the tailboard adjacent the fan blades of the rotating fan members.

12. The apparatus according to claim 11 wherein the axes of the fan members are generally parallel and generally at right angles to the guide surface of the tailboard construction.

13. The apparatus according to claim 11 wherein the fan members are arranged such that at least some crop material exiting from the fan blades engages at least one of the fins on the tailboard construction.

14. The apparatus according to claim 11 wherein the fan members each comprises a bottom wall with the fan blades extending generally at right angles to the bottom wall so that the fan blades are open at edges thereof opposite the bottom wall and so that crop material lifting upwardly out of the fan members encounters the guide surface.

15. The apparatus according to claim 14 wherein the bottom wall of each of the fan members and the guide surface of the tailboard construction are generally parallel.

16. A chopper and discharge apparatus arranged to be mounted at the rear discharge of a combine harvester for receiving and discharging materials from the combine harvester comprising straw and/or chaff, the apparatus comprising:

a housing having a feed opening into which a stream of said materials comprising straw and/or chaff is fed from the combine harvester;

a chopping assembly mounted in the housing for chopping said stream to form chopped materials;

the housing having a discharge opening through which the chopped materials are discharged;

two rotating fan members each having a plurality of fan blades around an axis of the fan member so that the crop material from the discharge opening enters the fan members and is carried around the axis by the fan blades for discharge;

a tailboard construction for spreading of the crop materials;

the tailboard construction having a downwardly facing guide surface of the tailboard construction and a plurality of guide fins extending downwardly from the guide surface, the guide fins having a leading edge and fin surfaces at least some of which extend from the leading edge rearwardly and outwardly from the leading edge to guide at least some of the chopped materials in a spread pattern;

wherein the two fan members are located underneath the tailboard with the downwardly extending guide fins of the tailboard adjacent the fan blades of the rotating fan members;

wherein the axes of the fan members are generally parallel and generally at right angles to the guide surface of the tailboard construction;

wherein the fan members each comprises a bottom wall with the fan blades extending generally at right angles to the bottom wall;

and wherein the bottom wall of each of the fan members and the guide surface of the tailboard construction are generally parallel.

17. The apparatus according to claim 16 wherein the fan blades are open at edges thereof opposite the bottom wall so that crop material lifting upwardly out of the fan members encounters the guide surface.

18. A chopper and discharge apparatus arranged to be mounted at the rear discharge of a combine harvester for receiving and discharging materials from the combine harvester comprising straw and/or chaff, the apparatus comprising:

a housing having a feed opening into which a stream of said materials comprising straw and/or chaff is fed from the combine harvester;

a chopping assembly mounted in the housing for chopping said stream to form chopped materials;

the housing having a discharge opening through which the chopped materials are discharged;

a rotary spreader for spreading the crop material, the rotary spreader comprising rotating fan members each having a plurality of fan blades around an axis of the fan member so that the crop material enters the fan members and is carried around the axis by the fan members for discharge;

a tailboard construction for spreading of the crop materials;

the tailboard construction having a downwardly facing guide surface of the tailboard construction and a plurality of guide fins extending downwardly from the guide surface, the guide fins having a leading edge and fin surfaces at least some of which extend from the leading edge rearwardly and outwardly from the leading edge to guide at least some of the chopped materials in a spread pattern;

wherein the rotary spreader is movable from an operating position downwardly and forwardly to a retracted position underneath the housing.

19. The apparatus according to claim 18 wherein in the operating position the axes of the fan members are generally parallel and generally at right angles to the guide surface of the tailboard construction.

20. The apparatus according to claim 18 wherein in the operating position the rotary spreader is arranged such that at least some crop material exiting from the fan blades engages at least one of the guide fins.

21. The apparatus according to claim 18 wherein the fan members each comprise a bottom wall with the fan blades extending generally at right angles thereto so that the fan blades are open at edges thereof opposite the base wall and so that in the operating position crop material lifting upwardly out of the fan members encounters the guide fins of the tailboard.

22. The apparatus according to claim 21 wherein in the operating position the bottom wall of each of the fan members and the guide surface are generally parallel.

23. A chopper and discharge apparatus arranged to be mounted at the rear discharge of a combine harvester for receiving and discharging materials from the combine harvester comprising straw and/or chaff, the apparatus comprising:
 a housing having a feed opening into which a stream of said materials comprising straw and/or chaff is fed from the combine harvester;
 a chopping assembly mounted in the housing for chopping said stream to form chopped materials;
 the housing having a discharge opening through which the chopped materials are discharged;
 a rotary spreader for spreading the crop material, the rotary spreader comprising rotating fan members each having a plurality of fan blades around an axis of the fan member so that the crop material enters the fan members and is carried around the axis by the fan members for discharge;
 a tailboard construction for spreading of the crop materials;
 the tailboard construction having a downwardly facing guide surface of the tailboard construction and a plurality of guide fins extending downwardly from the guide surface, the guide fins having a leading edge and fin surfaces at least some of which extend from the leading edge rearwardly and outwardly from the leading edge to guide at least some of the chopped materials in a spread pattern;
 wherein the fan members each comprise a bottom wall lying in a radial plane of the axes and wherein, in an operating position of the rotary spreader and the guide surface, the blades extend upwardly from the bottom wall and the bottom wall and the guide surface are generally parallel.

24. The apparatus according to claim 23 wherein in the operating position the axes of the fan members are generally parallel and generally at right angles to the tailboard.

25. The apparatus according to claim 23 wherein the fan members are arranged such that at least some crop material exiting from the fan blades engages at least one of the fins on the tailboard construction.

26. The apparatus according to claim 23 wherein the fan members each comprises a bottom wall with the fan blades extending generally at right angles to the bottom wall so that the fan blades are open at edges thereof opposite the bottom wall and so that crop material lifting upwardly out of the fan members encounters the guide surface.

27. The apparatus according to claim 23 wherein the bottom wall of each of the fan members and the guide surface of the tailboard construction are generally parallel.

28. The apparatus according to claim 23 wherein the rotary spreader is movable downwardly and forwardly to a retracted position underneath the housing.

29. A chopper and discharge apparatus arranged to be mounted at the rear discharge of a combine harvester for receiving and discharging materials from the combine harvester comprising straw and/or chaff, the apparatus comprising:
 a housing having a feed opening into which a stream of said materials comprising straw and/or chaff is fed from the combine harvester;
 a chopping assembly mounted in the housing for chopping said stream to form chopped materials;
 the housing having a discharge opening through which the chopped materials are discharged;
 a rotary spreader for spreading the crop material, the rotary spreader comprising rotating fan members each having a plurality of fan blades around an axis of the fan member so that the crop material enters the fan members and is carried around the axis by the fan members for discharge;
 a tailboard construction for spreading of the crop materials;
 the tailboard construction having a downwardly facing guide surface of the tailboard construction and a plurality of guide fins extending downwardly from the guide surface, the guide fins having a leading edge and fin surfaces at least some of which extend from the leading edge rearwardly and outwardly from the leading edge to guide at least some of the chopped materials in a spread pattern;
 wherein in an operating position the rotary spreader is arranged adjacent the fins on the tailboard construction such that at least some crop material exiting from the fan members engages at least one of the fins on the tailboard construction;
 and wherein the rotary spreader is movable from the operating position to a retracted position spaced from the fins on the tailboard construction.

30. The apparatus according to claim 29 wherein the axes of the fan members are generally parallel and generally at right angles to the guide surface of the tailboard construction.

31. The apparatus according to claim 29 wherein the fan members are arranged such that at least some crop material exiting from the fan blades engages at least one of the fins on the tailboard construction.

32. The apparatus according to claim 29 wherein the fan members each comprises a bottom wall with the fan blades extending generally at right angles to the bottom wall so that the fan blades are open at edges thereof opposite the bottom wall and so that crop material lifting upwardly out of the fan members encounters the guide surface.

33. The apparatus according to claim 31 wherein the rotary spreader is movable downwardly and forwardly to a retracted position underneath the housing.

* * * * *